United States Patent
He et al.

(10) Patent No.: US 9,223,144 B2
(45) Date of Patent: Dec. 29, 2015

(54) DISPLAY AND ELECTRONIC DEVICE

(71) Applicant: INNOLUX CORPORATION, Miao-Li County (TW)

(72) Inventors: Jhen-Wei He, Miao-Li County (TW); Ching-Hua Hung, Miao-Li County (TW); Kuan-Hsiung Wang, Miao-Li County (TW); Yung-Hsun Wu, Miao-Li County (TW)

(73) Assignee: INNOLUX CORPORATION, Miao-Li County (TW)

(*) Notice: Subject to any disclaimer, the term of this patent is extended or adjusted under 35 U.S.C. 154(b) by 4 days.

(21) Appl. No.: 14/447,933

(22) Filed: Jul. 31, 2014

(65) Prior Publication Data

US 2014/0340747 A1 Nov. 20, 2014

Related U.S. Application Data

(63) Continuation of application No. 13/187,535, filed on Jul. 21, 2011, now Pat. No. 8,848,116.

(51) Int. Cl.
*G02B 27/26* (2006.01)
*G02B 27/22* (2006.01)
(Continued)

(52) U.S. Cl.
CPC ............... *G02B 27/26* (2013.01); *G02B 27/22* (2013.01); *G02B 27/2242* (2013.01); *G02B 27/2264* (2013.01); *G02F 1/0136* (2013.01);
(Continued)

(58) Field of Classification Search
CPC .... G02B 27/26; G02B 27/22; G02B 27/2242; G02B 27/2264; G02F 1/0136; H04N 13/0402; H04N 13/0434; H04N 2213/001

USPC .............................................. 349/15; 359/465
See application file for complete search history.

(56) References Cited

U.S. PATENT DOCUMENTS

| 8,848,116 B2* | 9/2014 | He et al. ........................ 349/15 |
| 2004/0212767 A1* | 10/2004 | Sasaki et al. .................. 349/118 |
| 2006/0197725 A1* | 9/2006 | Nam et al. ...................... 345/87 |

(Continued)

FOREIGN PATENT DOCUMENTS

JP 05232403 A * 9/1993

OTHER PUBLICATIONS

Kato, Ikuo, Display Device, Sep. 10, 1993, Machine Translation of JP 05-232403 A from Patent Abstracts of Japan website, All pages.*

*Primary Examiner* — Dennis Y Kim

(74) *Attorney, Agent, or Firm* — Li & Cai Intellectual Property (USA) Office

(57) ABSTRACT

A display including a display panel and a switchable retarder is provided. The switchable retarder disposed on a light path of a polarized image having a first polarization provided by the display panel and includes a first substrate, first electrode stripes, second electrode stripes, and a retardation medium. The first electrode stripes and the second electrode stripes are disposed between the display panel and the first substrate, and are electrically independent from each other. A retardation region is defined by each first electrode stripe and one second electrode stripe. The retardation medium is located at a side of the first electrode stripes and at a side of the second electrode stripes, and is controlled by an electric field in the corresponding retardation region such that each retardation region provides a retardation. Accordingly, the polarized image having the first polarization is transformed into the polarized image having a second polarization.

12 Claims, 16 Drawing Sheets

(51) Int. Cl.
*H04N 13/04* (2006.01)
*G02F 1/01* (2006.01)

(52) U.S. Cl.
CPC ....... *H04N13/0402* (2013.01); *H04N 13/0434* (2013.01); *H04N 2213/001* (2013.01)

(56) References Cited

U.S. PATENT DOCUMENTS

2007/0103547 A1* 5/2007 Kim et al. ............. 348/55
2009/0102990 A1* 4/2009 Walton et al. .......... 349/15

* cited by examiner

DISPLAY AND ELECTRONIC DEVICE

CROSS REFERENCE TO RELATED APPLICATION

This application is a continuation application of U.S. application Ser. No. 13/187,535, filed on Jul. 21, 2011, and entitled "DISPLAY, ELECTRONIC DEVICE AND DISPLAY METHOD OF DISPLAY", the entire contents of which are hereby incorporated by reference.

BACKGROUND OF THE DISCLOSURE

1. Technical Field

The disclosure relates to a display and an electronic device, and particularly, to a display capable of showing the displayed images having variant polarizations and electronic device having the same.

2. Description of Related Art

Generally, the displayed images are refreshed according to the sequence of the scan lines in an LCD display device. Namely, by serving the pixels arranged in a row of the transversal direction in the image as a unit in the LCD display device, the displayed images are refreshed according to the sequence of the rows in the direction from the top of the image to the bottom of the image. Such method is called the sequential scanning method. The liquid crystals used in the direct-view type LCD display device have slow response speed, and thus the refresh time for completely refreshing the pixels displaying the images requires about one frame time. Accordingly, the pixels displaying images in the direct-view type LCD device are refreshed sequentially within one period of the vertical synchronous signal.

As a result, at a particular time point within one frame time, the pixels corresponding to a particular region of the image display the image information of the current frame while the pixels corresponding to the other region of the image display the image information of the previous frame.

Along with the advancement of technology, the display device are progressively innovated so that the requirements on images are more and more variant. The current display device though have the superior characteristics such as high resolution, high contrast ratio, high brightness, and the like, the displayed images are restricted in 2D (two dimensional) images rather than the 3D (three dimensional) images. For achieving the effect of displaying more lifelike or vivid images, the 3D image display technology is gradually developed.

The 3D image display technology is categorized into two type. One is auto-stereoscopic display technology, which is also called the naked-eye type 3D display technology. The auto-stereoscopic display is achieved by configuring a biconvex lens or a barrier in front of the display panel, such that the left eye and the right eye of the user can receive different images for generating a 3D image through the variant viewing angles of the left eye and the right eye.

The other one is the technology utilizing the polarized effect of the images to simultaneously output two images having different polarizations. In the meantime, the user can see the 3D images by wearing the polarized glasses. Such 3D display technology is also called stereoscopic display technology. The stereoscopic display technology has been developed maturely and widely used in certain applications such as military simulation or entertainments.

One of the conventional stereoscopic display is achieved by configuring a patterned retarder in front of the display panel, wherein the patterned retarder has a plurality of first retardation patterns and a plurality of second patterned retarders. Each of the first retardation patterns provides a first retardation, and each of the second retardation patterns provides a second retardation, wherein the first retardation is different from the second retardation.

After the stereoscopic display receives a first image signal and a second image signal different from the first image signal provided by an external device, the image processing module in the stereoscopic display would analyze the first image signal to obtain a corresponding first image information, as well as analyze the second image signal to obtain a corresponding second image information. A plurality of pixels corresponding to the first retardation patterns in the display panel of the stereoscopic display displays the first image information while a plurality of pixels corresponding to the second retardation patterns in the display panel displays the second image information when the stereoscopic display displays images. The displayed image of the first image information can have a first polarization after passing through the first retardation patterns, and the displayed image of the second image information can have a second polarization after passing through the second retardation patterns. In the polarized glasses wore by the use, one lens, such as the left eye lens, allows the light having the first polarization passing therethrough and the other lens, such as the right eye lens, allows the light having the second polarization passing therethrough. Accordingly, the two eyes of the user can receive different image information to obtain the 3D image.

Nevertheless, under such configuration, the left eye of the user only receives the first image information displayed by a portion of the pixels and the right eye of the user only receives the second image information displayed by the other portion of the pixels. Therefore, the resolution of the 3D image is half of the amount of the pixels in the display panel, which fails to achieve high resolution display quality.

SUMMARY

The disclosure provides a display providing the polarized displayed images having different polarizations without reducing the resolution of the image so that the user sees the predetermined image through a polarizing element.

The disclosure provides an electronic device having the display capable of providing the polarized displayed images having different polarizations.

The disclosure provides a display method of a display, in which the switchable retarder is switched synchronously with the pixels of the display panel for displaying two images.

The disclosure provides a display including a display panel and a switchable retarder. The display panel provides a polarized image having a first polarization and the switchable retarder is configured on the light path of the polarized image. The switchable retarder includes a first substrate, a plurality of first electrode stripes, a plurality of second electrode stripes, and a retardation medium. The first substrate is configured on the display panel. The first electrode stripes and the second electrode stripes are configured between the display panel and the first substrate, and are electrically independent from each other. Each of the first electrode stripes and one of the second electrode stripes define a retardation region. The retardation medium is configured between the display panel and the first substrate and located at a side of the first electrode stripes and a side of the second electrode stripes. The retardation medium located in each retardation region is controlled by an electric field formed between the corresponding first electrode stripe and the corresponding second electrode stripe to provide a retardation, such that the polarized imaged passing through the switchable retarder is transformed into a polarized image having a second polarization.

In one embodiment of the disclosure, the display panel has a plurality of pixels arranged in rows and lines and an area of each of the retardation regions corresponds to an area of numbers of the plurality of pixels. For instance, one retardation region corresponds to at least one line of the plurality of the pixels. In addition, in one embodiment, the display panel has a timing control unit for driving the plurality of pixel, and the timing control unit is further electrically connected to the first electrode stripes and the second electrode stripes to apply corresponding control voltages to the first electrode stripes and the second electrode stripes.

In one embodiment of the disclosure, the display further includes a control chip electrically connected to the first electrode stripes and the second electrode stripes to apply the corresponding voltages to the first electrode stripes and the second electrode stripes.

In one embodiment of the disclosure, the switchable retarder further includes a second substrate configured between the display panel and the first substrate, and the first electrode stripes, the second electrode stripes, and the retardation medium are configured between the first substrate and the second substrate.

In one embodiment of the disclosure, the first electrode stripes are located between the retardation medium and the first substrate while the second electrodes stripes are located between the retardation medium and the display panel. Herein, the extending direction of the first electrode stripes is the same to or different from the extending direction of the second electrode stripes.

In one embodiment of the disclosure, the first electrode stripes and the second electrode stripes are simultaneously located between the retardation medium and the display panel or simultaneously located between the retardation medium and the first substrate, and the extending direction of the first electrode stripes is the same to the extending direction of the second electrode stripes. In one embodiment, the first electrode stripes and the second electrode stripes are co-planar with each other.

In one embodiment of the disclosure, the display panel includes a polarizer configured adjacent to the switchable retarder to provide the polarized image.

In one embodiment of the disclosure, the display further includes a ¼ wavelength plate configured at a side of the switchable retarder when the polarized image has a linear polarization.

In one embodiment of the disclosure, the second polarization is identical to the first polarization when the retardation is zero.

In one embodiment of the disclosure, the second polarization is different from the first polarization when the retardation is greater or smaller than zero.

In one embodiment of the disclosure, the polarizing element includes a first polarization portion and a second polarization portion. The polarization of the first polarization portion is substantially identical to the polarization of the first polarized displayed image and the polarization of the second polarization portion is substantially identical to the polarization of the second polarized displayed image.

In one embodiment of the disclosure, the polarizing element has a single polarization identical to the polarization of the first polarized displayed image or the polarization of the second polarized displayed image.

The disclosure also provides an electronic device including the abovementioned display and an input unit. The input unit is coupled to the display panel and the input unit provides an input function to the display panel such that the display displays images.

The disclosure further provides a display method of a display, wherein the display includes a display panel having a plurality of pixels arranged in rows and lines and a switchable retarder having a plurality of retardation regions. The switchable retarder is located above the display panel and electrically connected to the display panel and each of the retardation regions corresponds to an area of numbers of the plurality of pixels. The display method includes first providing an image information. Next, the image information having a first polarization is displayed sequentially according to a scanning sequence of the display panel, and the retardation regions corresponding to the scanning sequence are synchronically driven such that the image information having the first polarization is transformed into the image information having a second polarization.

In one embodiment of the disclosure, the relationship of the polarization lies in that the second polarization is identical to the first polarization.

In one embodiment of the disclosure, the relationship of the polarization lies in that the second polarization is different from the first polarization.

In view of the above, a switch-able retarder is configured in front of the display panel capable of providing a polarized image in the display and the electronic device of the invention. The retardation regions of the switchable retarder can be switched individually. Accordingly, the light provided by each pixel in the display panel can be transformed into the second polarized displayed image having different polarizations. The predetermined 3D images or 2D images can be obtained when the user watches the images displayed by the display through a polarizing element. As such, the 3D images displayed by the display and the electronic device can have the resolution equivalent to the resolution of the display panel.

In order to make the aforementioned and other features and advantages of the disclosure more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1A:
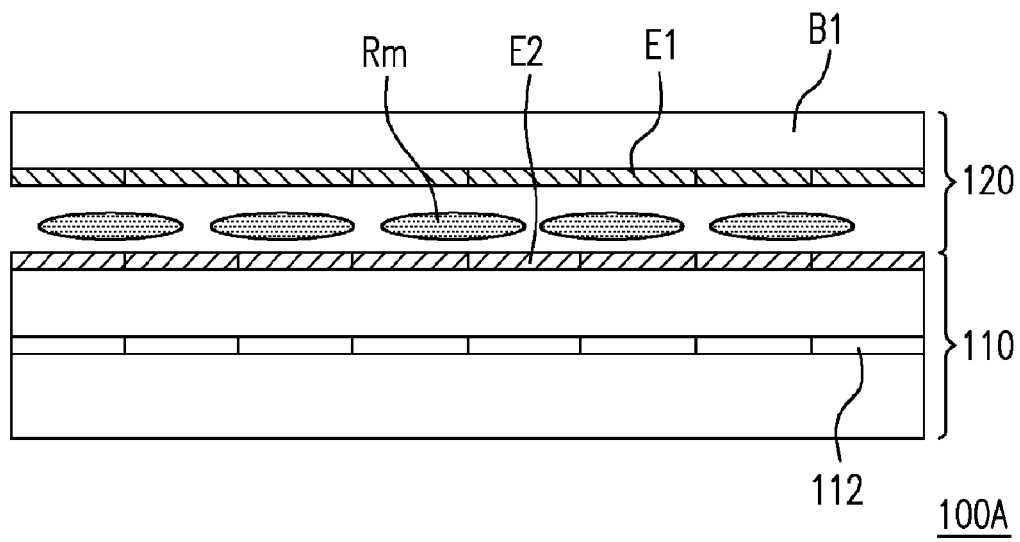
FIGS. 1A and 1B illustrate schematic cross-sectional views of the displays according to two embodiments of the disclosure.
Figure 1B:
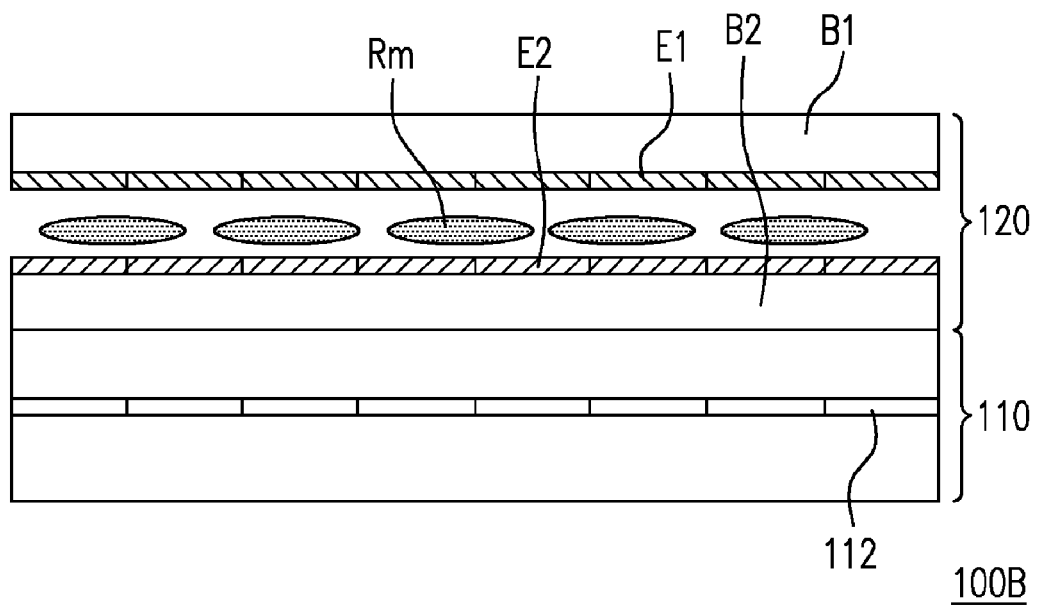

For achieving the switching of the retardation, FIGS. 1A and 1B illustrate schematic cross-sectional views of the displays according to two embodiments of the disclosure. Referring to FIG. 1A, the display 100A includes a display panel 110 and a switchable retarder 120, wherein the display panel 110 comprises the interlacing of a plurality of scan lines and a plurality of data lines and has a plurality of pixels 112. The switchable retarder 120 comprises a plurality of first electrode stripes E1, a plurality of second electrode stripes E2, and a retardation medium Rm, wherein the retardation medium Rm can present various arrangement by the electric field formed between the first electrode stripes E1 and the second electrode stripes E2 to achieve the switching of the provided retardation.

Furthermore, the switchable retarder 120 further includes a first substrate B1 for carrying and accommodating the plurality of first electrode stripes E1, the plurality of second electrode stripes E2, and the retardation medium Rm. As shown in FIG. 1A, the first electrode stripes E1 are disposed on the first substrate B1 and the second electrode stripes E2 are disposed on the display panel 110 in the present embodiment. The retardation medium Rm is disposed between the first electrode stripes E1 and second electrode stripes E2 which are configured opposite to each other. The display panel 110 in such design can be served as the substrate carrying the second electrode stripes E2 for helping in the reduction of the thickness of the display 100A.

In addition, referring to FIG. 1B, the display 100B has the design of the elements in display 100A and is further configured with another substrate B2. The substrate B2 is located between the display panel 110 and the substrate 110 and the second electrode stripes E2 of the switchable retarder 120 is configured on the substrate B2. The retardation medium Rm is disposed between the first electrode stripes E1 and second electrode stripes E2 opposite to each other. As shown in the above two embodiments, the second electrode stripes E2 of the switchable retarder 120 can be selectively disposed on the display panel 110 directly or disposed on the independent substrate B2.

Various embodiments are introduced in detail in the following for describing the scope of the disclosure, and the displays in the following descriptions can be designed according to the element design of one of the above displays 100A and 100B for achieving the switching of the retardation. In other words, the abovementioned disposition relationships of the switchable retarder 120 and the display panel 110 can be used for forming the displays in the following embodiments or the following switchable retarders can be used in the abovementioned display 100A or display 100B.

Figure 1C:
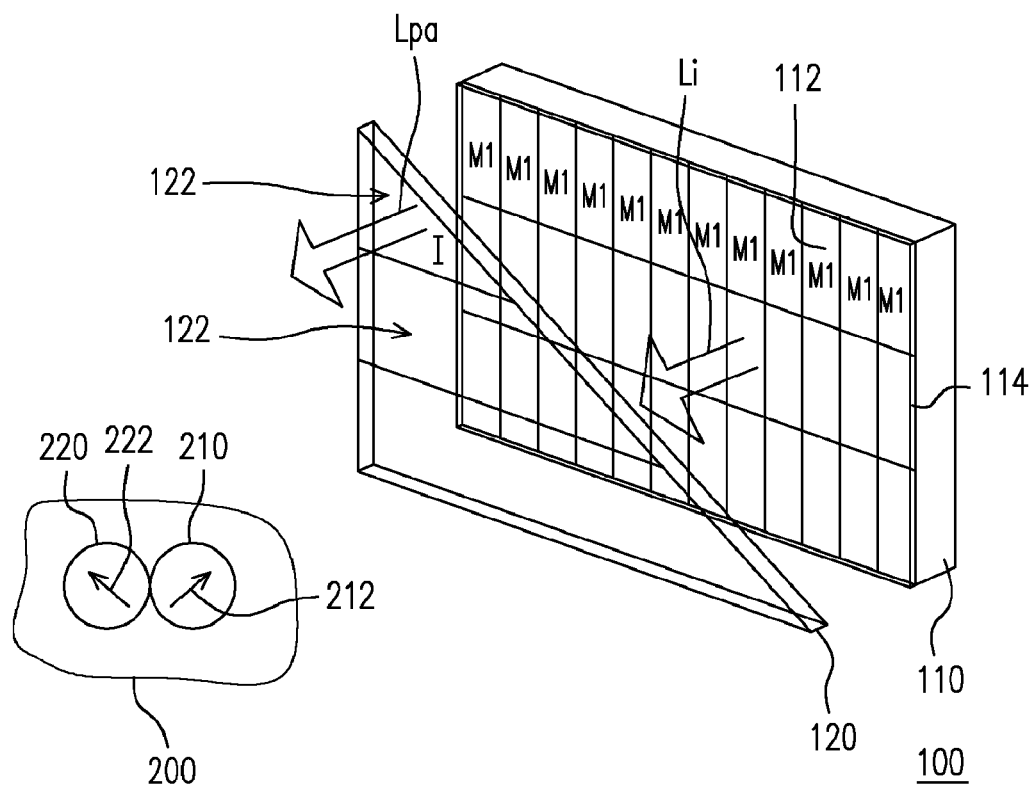
FIGS. 1C and 1D illustrate schematic views of the display according to an embodiment of the disclosure under different scanning frames.
Figure 1D:
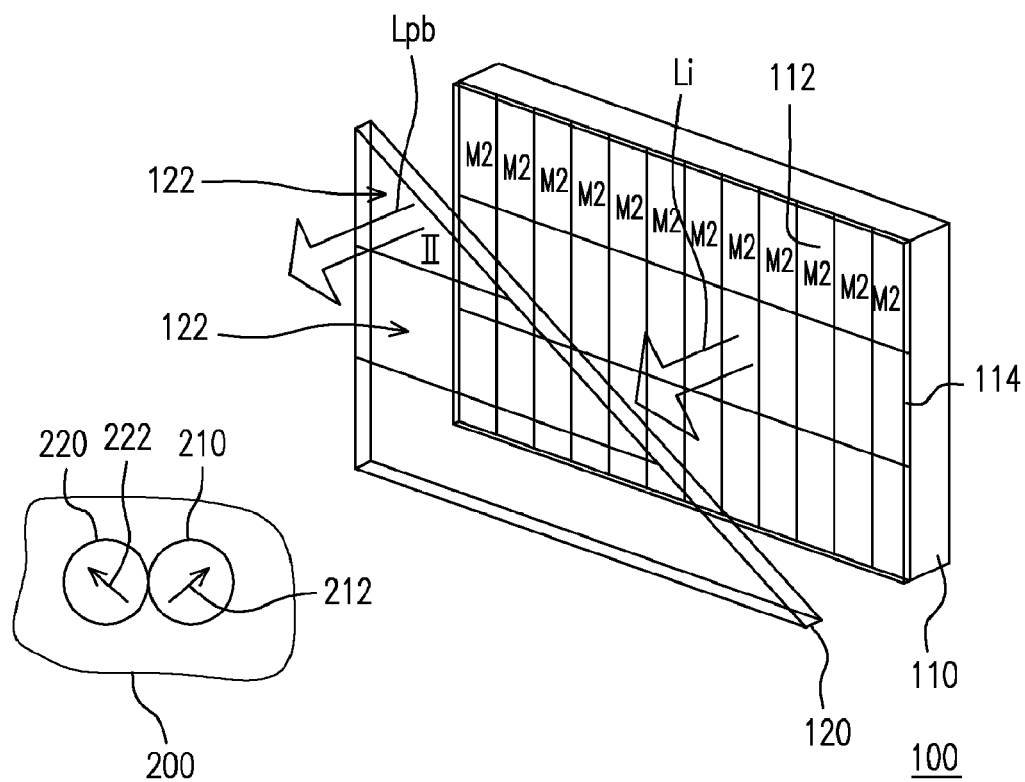

FIGS. 1C and 1D illustrate schematic views of the display according to an embodiment of the disclosure under different scanning frames. Referring to FIG. 1C, a display 100 includes a display panel 110 and a switchable retarder 120. The display panel 110 has a plurality of pixels 112 arranged in rows and lines and the display panel 110 is suitable for providing a polarized image Li having a first polarization. The switchable retarder 120 is disposed in front of the display panel 110, and particularly, the switchable retarder 120 is located on the light path of the polarized image L1.

In the display 100, the display panel 110 can be a liquid crystal display panel, a plasma display panel, an organic electro-luminescent display panel, other flat display panel, or a non-flat display panel. Further, for providing the polarized image Li, the display panel 110 can includes a polarizer 114 configured adjacent to the switchable retarder 120. Certainly, the polarizer 114 can be omitted when the display panel 110 displays the polarized image Li by other mechanisms. It is to say that the display panel 110 according to the disclosure can be configured without the polarizer 114.

According to the present embodiment, the switchable retarder 120 has a plurality of retardation regions 122. The area of each retardation region 122 corresponds to the area of numbers of the pixels 112. Herein, it is taken as en example that one retardation region 122 corresponds to one line of the pixels 112. In other embodiments, the retardation regions 122 can be arranged in other manners so that one retardation region 122 can correspond to a portion pixels 112 of the pixels 112 in the same line or correspond to multiple lines of the pixels 112. In addition, each retardation region 112 can provide different retardations alternately.

Each of the retardation regions 122 can, for example, perform the switching of a first retardation I and a second retardation II. In the scanning frame of FIG. 1C, a first image information M1 is transformed by the display panel 110 through the polarizer 114 or other mechanism so as to provide a polarized image Li having the first polarization when the pixels 112 in the same line of the display panel 110 display the first image information M1, wherein the polarized image Li has the first image information M1 with the first polarization. Simultaneously, the retardation region 122 corresponding to the same line of pixels 112 provides a first retardation, i.e., the polarized image Li passing through the retardation region 122 can be transformed into a second polarized displayed image Lpa, wherein the second polarized displayed image Lpa has the first image information with a second polarization.

Then, in the next scanning frame as shown in FIG. 1B, the switchable retarder 120 is switched so that the retardation regions 122 provide the second retardation II. A second image information M2 is transformed by the display panel 110 through the polarizer 114 or other mechanism so as to provide the polarized image Li having the first polarization when the pixels 112 in the same line of the display panel 110 display the second image information M2, wherein the polarized image Li has the second image information M2 with the first polarization. Herein, the retardation region 122 corresponding to the same line of pixels 112 provides the second retardation. Accordingly, the polarized image Li passing through the retardation region 122 can be transformed into a third polarized displayed imaged Lpb, wherein the third polarized displayed image Lpb has the second image information M2 with a third polarization.

As such, each pixel 112 can display the first image information M1 and the second image information M2 respectively in alternate scanning frames. The resolution of the image consisting of the first image information M1 is thus equivalent to the amount of the pixels 112. Similarly, the resolution of the image consisting of the second image information M2 is also equivalent to the amount of the pixels 112. In short, the condition that the resolution of the image is less than the amount of the pixels is not existed according to the present embodiment.

After the display 100 receives the first image signal and the second image signal provided by an external device, the image processing module in the display would analyze the first image signal to obtain the corresponding first image information M1, as well as analyze the second image signal to obtain the corresponding second image information M2 by the image processing module in the display 100.

The display 100 can display the first image information M1 according to the sequence of the scan lines in the display panel 110 from the top to the bottom, but the disclosure is not limited thereto. The display 100 can also display the first image information M1 according to the sequence of the scan lines in the display panel 110 from the bottom to the top and transform the first image information M1 through the polarizer 114 or other mechanism to provide the first image information M1 with the first polarization. In addition, the display 100 drives the retardation regions 122 corresponding to the pixels 112 synchronously so as to transform the first image information M1 with the first polarization into the first image information M1 with a second polarization.

After displaying the first image information M1, the display 100 can subsequently display the second image information M2 according to the sequence of the scan lines in the display panel 110 from the top to the bottom, but the disclosure is not limited thereto. The display 100 can also display the second image information M2 according to the sequence of the scan lines in the display panel 110 from the bottom to the top and transform the second image information M2 through the polarizer 114 or other mechanism to provide the second image information M2 with the first polarization. In addition, the display 100 drives the retardation regions 122 corresponding to the pixels 112 synchronously so as to transform the second image information M2 with the first polarization into the second image information M2 with a third polarization.

The relationships of the polarizations can lie in that the second polarization and the third polarization are identical to the first polarization; one of the second polarization and the second polarization is the same to the first polarization while the other is different from the first polarization; or the second and the third polarizations are different from the first polarization while the second polarization is different from the third polarization. In other words, the second polarization can be identical to or different from the third polarization and the second polarization can be identical to or different from the first polarization.

The display method of the display 100 can include providing the first retardation I by a portion of the retardation regions 122 and displaying the first image information by the pixels corresponding to the portion of the retardation regions 122 in a same scanning frame. Meanwhile, the second retardation II is provided by the other of the retardation regions 122 and the pixels corresponding to the other of the retardation regions 122 display the second image information M2 in the same scanning frame. That is to say, in the same scanning frame, a portion of the retardation regions 112 in the switchable retarder 120 has the first retardation I and the other portion of the retardation regions 122 has the second retardation II. In the next scanning frame, each retardation region 122 can be switched to have another retardation.

It is noted that the adjacent retardation regions 122 are not restricted to have the same retardation or different retardations in the same scanning frame according to the disclosure. Namely, in the same scanning frame, numbers of the retardation regions 122 at different positions can provide the first retardation I and the second retardation II such that the regions providing the first retardation I and the second retardation II are alternately arranged; numbers of the retardation regions 122 at different positions can simultaneously provide the first retardation I or the second retardation II; a portion of the retardation regions 122 among numbers of the retardation regions 122 at different positions provide the first retardation I while another portion of the retardation regions 122 among numbers of the retardation regions 122 at different positions provide the second retardation II; etc.

Furthermore, for satisfying the feeling of human eyes with respect to the images, the refreshing frequency of a single image is at least 60 Hz. Accordingly, the refreshing frequency of the display panel 110 according to the present embodiment can be 120 Hz. In the meantime, the switching frequency of each retardation region 122 in the switchable retarder 120 can be set correspondingly as 120 Hz. Certainly, the above display method and the refreshing frequency are merely exemplary and should by no means limit the scope of the disclosure. Accordingly, the refreshing frequency of the display panel 110 according to the present embodiment can be 60 Hz, 240 Hz, and the like.

The images presented by the second polarized displayed image Lpa and the third polarized displayed image Lpb can be two images independent from each other. Therefore, for viewing at least one image, the user can watch the image displayed by the display 100 through a polarizing element 200. As such, the specific 3D image or the specific 2D image can be obtained by the user. Herein, the specific images are the images predetermined to present to the user and thus can be called predetermined images.

If the predetermined image the user wants to watch is a 3D image, the polarizing element 200 includes a first polarization portion 210 and a second polarization portion 220. For instance, the polarizing element 200 can be a polarized glasses having dual lens and each lens can be a polarization portion. The polarization 212 of the first polarization portion 210 is substantially identical to the polarization of the second polarized displayed image Lpa and the polarization 222 of the second polarization portion 220 is substantially identical to the polarization of the third polarized displayed image Lpb. Accordingly, the two eyes of the user respectively receive the image consisting of the second polarized displayed image Lpa and the image consisting of the third polarizing displayed image Lpb. The user can obtain the 3D image when parallax is formed between the images consisting of the second polarized displayed image Lpa and the third polarized displayed image Lpb.

Owing that the images consisting of the second polarized displayed image Lpa and the third polarized displayed image Lpb can have the same resolution as the display panel 110, the 3D image obtained by the user can have the same resolution. Therefore, the display 100 can display 3D image without reducing the resolution.

If the predetermined image the user wants to watch is a 2D image, the polarizing element 200 can have a signal polarization which can be equivalent to the polarization of the second polarized displayed image Lpa or that of the third polarized displayed image Lpb. Namely, when the polarizing element 200 is a polarized glasses, the two lens thereof can have the same polarization. Such design facilitates the display 100 having the dual-view function or privacy protecting function.

With respect to the dual-view function, the two lens of the polarized glasses used by the first user are assumed to have the same first polarization, and the two lens of the polarized glasses used by the second user are also assumed to have the same second polarization, wherein the polarized glasses used by the first user only allows the passing of the second polarized displayed image Lpa and the polarized glasses used by the second user only allows the passing of the third polarized displayed image Lpb. The first user sees the predetermined image consisting of the second polarized displayed image Lpa and the second user sees the predetermined image consisting of the third polarized displayed image Lpb for achieving the dual-view function.

With respect to the privacy protecting function, the display method of the display 100 can include displaying a predetermined image information by the corresponding pixels 112 when the retardation regions 122 provides the first retardation and displaying a noise image information by the corresponding pixels 112 when the retardation regions 122 provides the second retardation. The user sees the predetermined image presented by the predetermined image information only by using the polarizing element 200 allowing the passing of the second polarized displayed image Lpa. Other users who does not use the polarizing element 200 or uses another polarizing element having alternate polarization would see the noise image consisting of the predetermined image information and the noise image information and fail to really obtain the predetermined image. As a result, the display 100 has the privacy protecting function. As a whole, the design of the display 100 uses the polarizing element 200 to provide the decoding function so that the user can obtain the predetermined images correctly without losing of the resolution, wherein the predetermined images can be 2D images or 3D images.

Figure 2A:
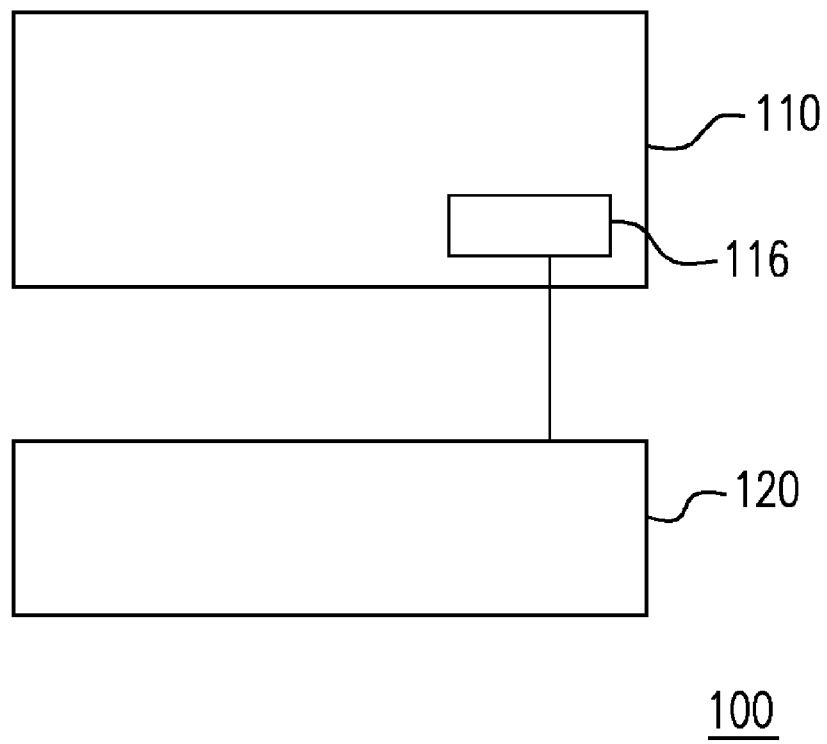
FIGS. 2A and 2B illustrate schematic circuit block diagrams of the display according to an embodiment of the disclosure.
Figure 2B:
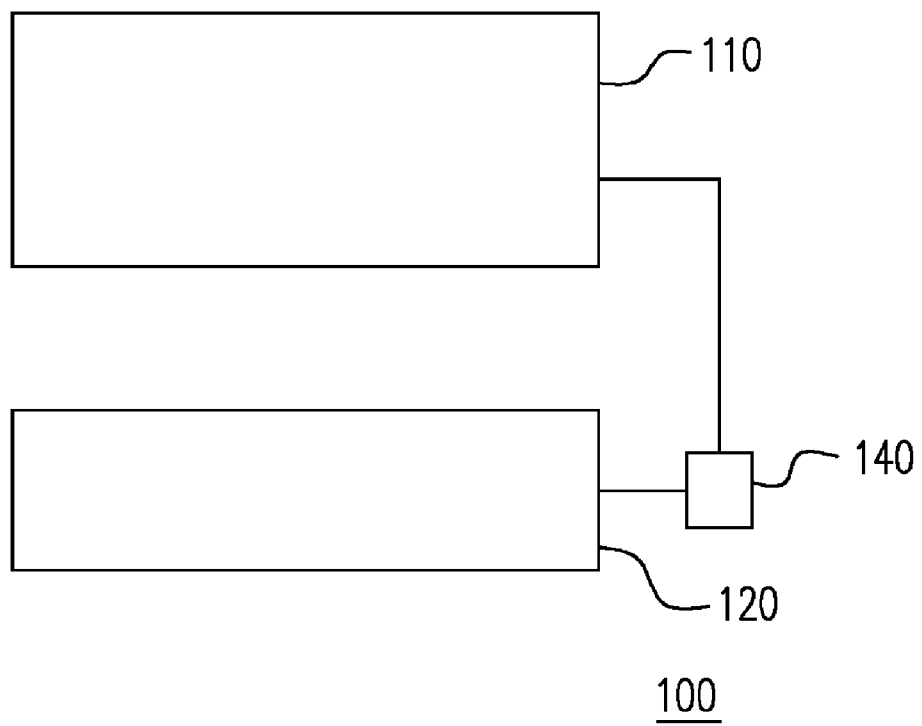

FIGS. 2A and 2B illustrate schematic circuit block diagrams of the display according to an embodiment of the disclosure. Referring to FIGS. 1A, 1B, 1C, 1D and 2A, the display panel 110 has the timing control unit 116 for driving the pixels 112. The timing control unit 116 is further electrically connected to the switchable retarder 120 to input corresponding control voltages for changing the retardation of each retardation region 122. The retardation of each retardation region 122 can be switched by the timing control unit 116 in the display panel 110 according to the present embodiment, which is conducive to simplifying the circuit design and the driving method of the display 100. In other words, the driving method of the switchable retarder 120 is passive driving method.

In particular, when the pixels 112 in one line are driven by one scan line and one retardation region 122 corresponds to the pixels 112 in the one line, the timing control unit 116 drives all of the pixels 112 in the one line and synchronously switches the retardation of the corresponding retardation region 122. Accordingly, the refreshing frequency of the switchable retarder 120 can be synchronous with the display panel 110 easily, which effectively prevents from the image stacking or the cross talk effect caused by the asynchronous refreshing frequencies of the switchable retarder 120 and the display panel 110 so as to achieve desirable display quality.

In addition, in the circuit block diagram shown in FIG. 2B, the display 100 further includes a control chip 140 electrically connected to the switchable retarder 120 and the display panel 110. The control chip 140 applies corresponding control signals to the switchable retarder 120 according to the refreshing frequency of the display panel 110, and thereby the retardation of each retardation region 122 is switched. Under such circuit design, the control chip 140 can, for instance, be connected with the timing control unit of the display panel 110 or the control chip 140 and the driving chip (not shown) of the display panel 110 can be simultaneously connected with a timing control unit (not shown) in an external device so as to synchronously refresh the switchable retarder 120 and the display panel 110.

Herein, the represented "synchronous" means that during one retardation region 122 is refreshed, all of the pixels 112 located in the one retardation region 112 are refreshed or during one retardation region 122 is refreshed, merely a portion pixels 112 of the pixels 112 located in the one retardation region 112 are refreshed. For instance, when one retardation region 122 corresponds to multiple lines of the pixels 112, the pixels 112 are driven by different scan lines. Accordingly, all of the pixels 112 in the same retardation region 122 are refreshed at different scanning sequence. In the meantime, the corresponding retardation region 122 can be refreshed synchronous with one of the scan lines, which satisfies the so called "synchronous". Certainly, when one retardation region 122 corresponds to just one line of pixels, the retardation region 122 and the corresponding line of pixels 122 can be refreshed at the same scanning sequence.

It is noted that the polarization represented in the present embodiment can be a circular polarization or a linear polarization, and therefore, the drawings in the figures representing the polarizations 212 and 222 by straight line are merely exemplary and should by no means limit the polarization to a circular polarization or a linear polarization. When the polarizer 114 is consisted of a circular polarizer or consisted of a linear polarizer accompanying with a ¼ wavelength plate, the polarized image Li has the circular polarization. Herein, the polarizations of the second polarized displayed image Lpa and the third polarized displayed image Lpb can be the circular polarizations such as the levorotary polarization or the dextrorotary polarization. In addition, the polarizations 212 and 222 can be the circular polarizations such as the levorotary polarization or the dextrorotary polarization for receiving the corresponding polarized displayed images.

When the polarization of the polarized image Li is the linear polarization, the polarizations of the second polarized displayed image Lpa and the third polarized displayed image Lpb can be the linear polarizations. Furthermore, the polarization 212 and the polarization 222 can be the linear polarizations. Generally, the linear polarized light can be seen in limited viewing angles. Therefore, in other embodiments such as the embodiment depicted in FIG. 3, the display 102 further includes a ¼ wavelength plate 130 in addition to the components of display 100. The ¼ wavelength plate 130 is disposed at a side of the switchable retarder 120 away from the display panel 110 so as to transform the second polarized displayed image Lpa and the third polarized displayed image Lpb into circular polarized images. Herein, the polarization 212 and the polarization 222 can, for example, be the circular polarizations to increase the viewing angle the user can see and improve the display quality of the display 102. In other embodiments, the ¼ wavelength plate 130 can be configured at a side of the switchable retarder 120 adjacent to the display panel 110.

In addition, the relationship between the first retardation and the second retardation is not restricted in the disclosure. For example, the first retardation and the second retardation can respectively be 0, .pi./2, .pi./4, or 3.pi./4, or any two of 0, .pi./2, .pi./4, 3.pi./4, and the like. That is to say, the first retardation and the second retardation are required to be different from each other according to the disclosure but the relationship therebetween is not particularly limited which can be modified according to various designs.

Several embodiments are illustrated in the followings to describe the switchable retarder of the disclosure. However, the following embodiments are merely exemplarily and should by no means limit the scope of the disclosure. Persons who have ordinary skill in the art knows that the retarders capable of achieving the abovementioned switching of the retardation satisfy the scope of the disclosure and include in the content of the disclosure.

Figure 4:
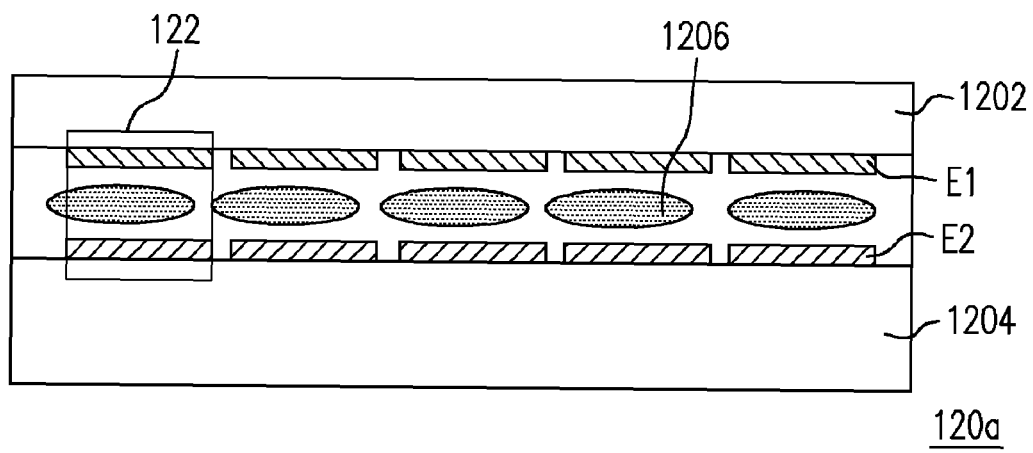
FIG. 4 illustrates a schematic cross-sectional view of the switchable retarder according to an embodiment of the disclosure.

FIG. 4 illustrates a schematic cross-sectional view of the switchable retarder according to an embodiment of the disclosure. Referring to FIG. 4, the switchable retarder 120a includes a first substrate 1202, a second substrate 1204, a retardation medium 1026, a plurality of first electrode stripes E1, and a plurality of second electrode stripes E2. The first substrate 1202 is disposed opposite to the second substrate 1204, and the retardation medium 1206 is configured between the first substrate 1202 and the second substrate 1204. The first electrode stripes E1 are disposed between the first substrate 1202 and the retardation medium 1206, and the second electrode stripes E2 are disposed between the second substrate 1204 and the retardation medium 1206. In addition, each of the first electrode stripes E1 and one of the second electrode stripes E2 define a retardation region 122.

Accompanying with the drawings of FIG. 2A and FIG. 2B, the first electrode stripes E1 and the second electrode stripes E2 are electrically connected to the timing control unit 116 depicted in FIG. 2A or electrically connected to the control chip 140 depicted in FIG. 2B to obtain the corresponding control voltages. Accordingly, an electric field can be formed between each first electrode stripe E1 and the corresponding second electrode stripe E2, which is used for controlling the status of the retardation medium 1206 in the corresponding retardation region 122. Namely, the change of the control voltages in the first electrode stripes E1 and the second electrode stripes E2 facilitates each retardation regions 122 providing different retardations so as to achieve the effect of the switchable retardation in the present embodiment. In other words, the driving method of the switchable retarder 120a is quite simple.

The retardation medium 1206 can be a twisted nematic liquid crystal material, a super twisted nematic liquid crystal material, a vertical aligned liquid crystal material, or an optical compensating birefringence liquid crystal material. Certainly, the materials capable of presenting different retardations according to the variance of the electric field can be served as the retardation medium 1206 of the disclosure. The first electrode stripes E1 and the second electrode stripes E2 are mainly formed by the stripe patterns of transparent conductive material. Nevertheless, in an alternate embodiment, the stripe patterns formed by the transparent conductive material can be disposed with metal lines (not shown) to enhance the transmission efficiency of the first electrode stripes E1 and the second electrode stripes E2. As a result, the disclosure does not limit to the utilization of the above materials.

Figure 3:
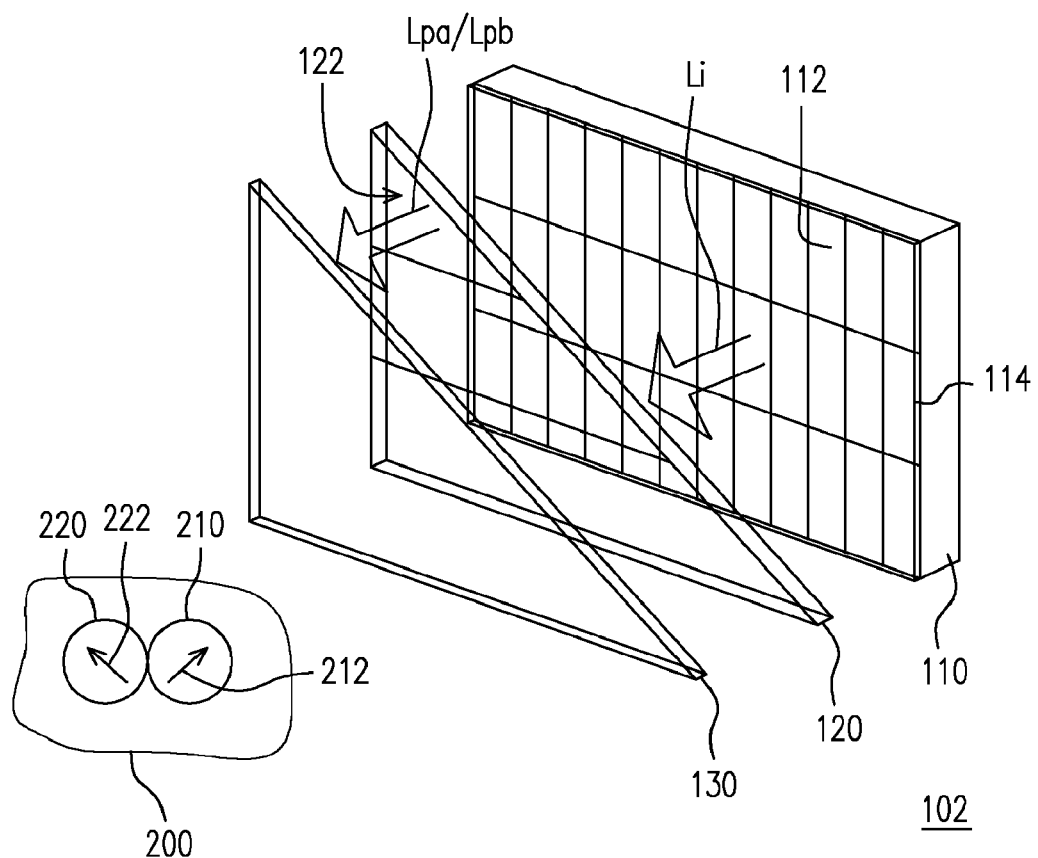
FIG. 3 illustrates a schematic view of a display according to another embodiment of the disclosure.

It is noted that the second substrate 1204 according to the present embodiment can be an independent transparent substrate, or the display panel 110 depicted in FIG. 1 or 3. The switchable retarder 120a can be adhered on a display panel through an adhesive to form the display 100 or 102 in FIG. 1 or 3 when the second substrate 1204 is an independent transparent substrate. Alternately, the second electrode stripes E2 are, for example, directly formed on the display panel 110 when the second substrate 1204 is the display panel 110 as shown in FIG. 1 or 3. For instance, when the surface of the display panel 110 adjacent to the switchable retarder 120a is configured with the polarizer 114 or the transparent protection layer such as cover glass (not shown), the second electrode stripes E2 are directly fabricated on the polarizer 114 or on the transparent protection layer. Accordingly, the display 100 or 102 can have thin thickness.

Figure 5:
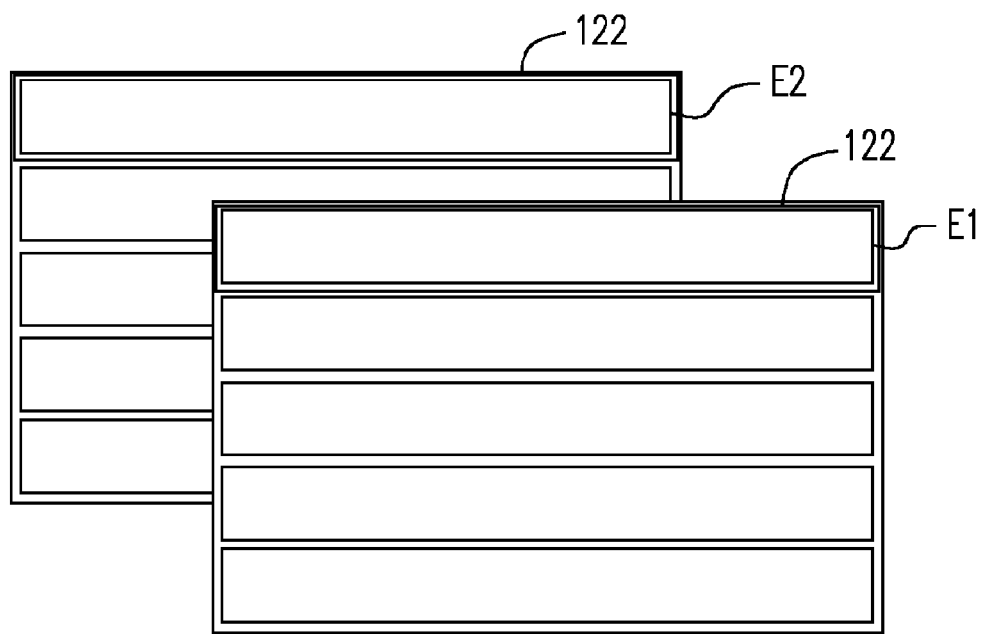
FIG. 5 illustrates schematic top views of the first electrode stripes E1 and the second electrode stripes E2 in the switchable retarder of FIG. 4 according to an embodiment.

Specifically, FIG. 5 illustrates schematic top views of the first electrode stripes E1 and the second electrode stripes E2 in the switchable retarder of FIG. 4 according to an embodiment. Referring to FIG. 5, the first electrode stripes E1 and the second electrode stripes E2 are, for instance, the transparent electrode stripes configured in parallel to each other. In addition, each of the first electrode stripes E1 and one of the second electrode stripes E2 are opposite to each other to define one retardation region 122. When the electrode layout is applied to the display 100 or 102 in FIG. 1 or 3, each retardation region 122 at least covers a line of the pixels 112. Accordingly, the refreshing frequency of the first electrode stripe E1 and the second electrode stripe E2 in each retardation region 122 can be synchronous with the refreshing frequency of the corresponding line of the pixels 112 to display images.

Figure 6:
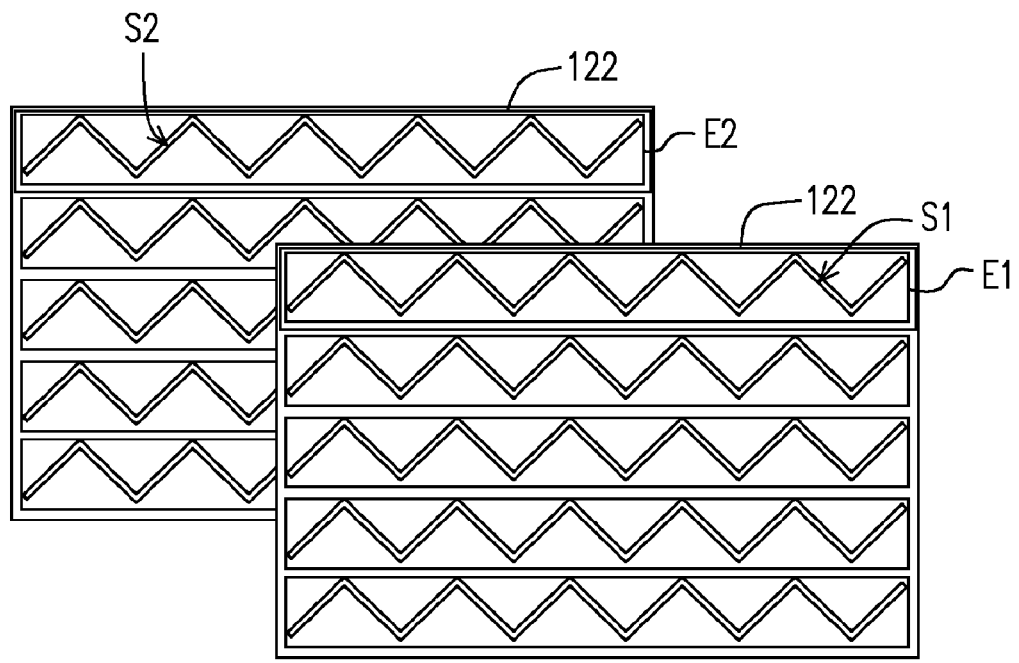
FIG. 6 illustrates schematic top views of the first electrode stripes E1 and the second electrode stripes E2 in the switchable retarder of FIG. 4 according to another embodiment.

FIG. 6 illustrates schematic top views of the first electrode stripes E1 and the second electrode stripes E2 in the switchable retarder of FIG. 4 according to another embodiment. Referring to FIG. 6, the first electrode stripes E1 and the second electrode stripes E2 respectively have a slit S1 and a slit S2. As such, the retardation medium 1206 in the switchable retarder 120a of FIG. 4 can be arranged in multi-domain arrangement owing to the influence of the slit S2 and the slit S2. Accordingly, the application of the switchable retarder 120a in the display 100 or 102 of FIG. 1 or 3 facilitates the wide-view display effect.

In the present embodiment, the shapes and the disposition locations of the slit S1 and the slit S2 are merely exemplarily. In alternate embodiments, the vertical projection areas of the slit S1 and the slit S2 on the first substrate 1202 or the second substrate 1204 of the switchable retarder 120a can overlap with each other or be separated by a distance. In addition, at least one of the slit S1 and the slit S2 can be replaced by a protrusion so as to make the retardation medium 1206 arranged in multi-domain arrangement. Furthermore, one of the first electrode stripe E1 and the second electrode stripe E2 can be selectively disposed with the slit S1 or S2 therein. Namely, the first electrode stripes E1 of FIG. 5 can be disposed in combination with the second electrode stripes E2 of FIG. 6, or the second electrode stripes E2 of FIG. 5 can be disposed in combination with the first electrode stripes E1 of FIG. 6. In addition, the vertical projection areas of the electrode stripes E1 and the second electrode stripes E2 on the first substrate 1202 can overlap with each other completely or partially.

Figure 7:
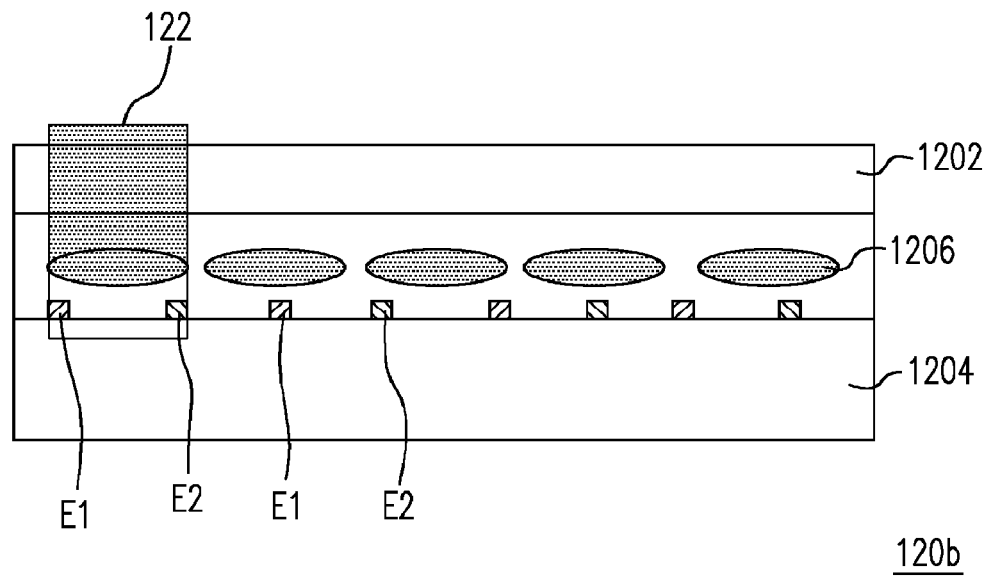
FIG. 7 illustrates a schematic cross-sectional view of the switchable retarder according to another embodiment of the disclosure.

FIG. 7 illustrates a schematic cross-sectional view of the switchable retarder according to another embodiment of the disclosure. Referring to FIG. 7, the components in the switchable retarder 120b are the same to those in the switchable retarder 120a and the components are not iterated described. Nevertheless, the first electrode stripes E1 and the second electrode stripes E2 in the switchable retarder 120b are disposed at a same side of the retardation medium 1206. Herein, the first electrode stripes E1 and the second electrode stripes E2 are disposed between the retardation medium 1206 and the second substrate 1204. However, in other embodiments, the first electrode stripes E1 and the second electrode stripes E2 can be disposed between the retardation medium 1206 and the first substrate 1202.

It is worth mentioning that in this embodiment, the first electrode stripes E1 and the second electrode stripes E2 are co-planar to each other and are arranged alternatively. That is, the switchable retarder 120b applies the in-plane switch disposition method. The arrangement of the retardation medium 1206 is transformed by subjecting the electric field formed between the adjacent first electrode stripe E1 and second electrode stripe E2 to provide different retardations.

In addition, the line widths of the first electrode stripes E1 and the second electrode stripes E2 are significantly reduced in comparison to the electrode stripes of the abovementioned embodiments, i.e. the first electrode stripes E1 and the second electrode stripes E2 are thin stripes. The first electrode stripes E1 and the second electrode stripes E2 can be formed by metal material for providing desirable transmission quality. Further, the disposition locations of the first electrode stripes E1 and the second electrode stripes E2 can be aligned to the light shielding elements in the display panel 110, such as the scan lines, the black matrix, and the like, when the switchable retarder 120b is applied in the display 100 or 102 of FIG. 1 or 3, such that the negative influence on the display brightness of the display 100 can be prevented.

Figure 8:
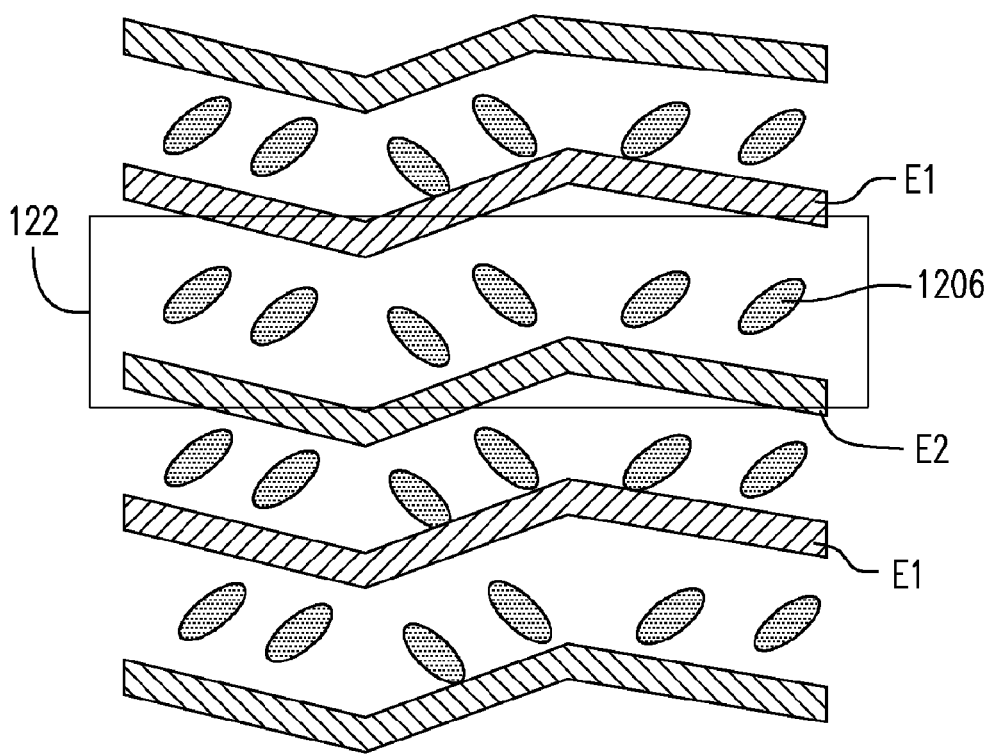
FIG. 8 illustrates schematic top views of electrode stripes in the switchable retarder of FIG. 7.

FIG. 8 illustrates schematic top views of electrode stripes in the switchable retarder of FIG. 7. Referring to FIG. 8, the first electrode stripes E1 and the second electrode stripes E2 are substantially strip electrodes having zigzag patterns. The main extending directions of the first electrode stripes E1 and the second electrode stripes E2 are substantially the same to define the retardation regions 122 with bar-like shape. Under the pattern design of the electrodes, one retardation region 122 has the electric fields in variant directions so that the retardation medium 1206 can be arranged in different direction. Therefore, the design of the electrode stripes in FIG. 8 further conduces to the achievement of the wide-view display effect.

Figure 9:
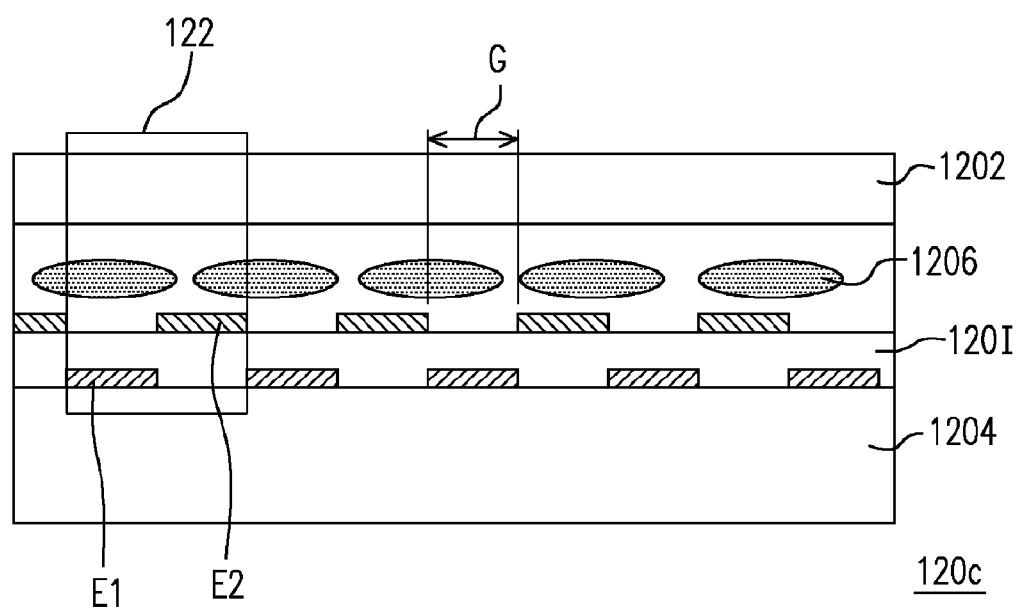
FIG. 9 illustrates a schematic cross-sectional view of the switchable retarder according to further another embodiment of the disclosure.

FIG. 9 illustrates a schematic cross-sectional view of the switchable retarder according to further another embodiment of the disclosure. Referring to FIG. 9, the components in the switchable retarder 120c are the same to those in the switchable retarder 120b and those components are not iterated described. Nevertheless, the first electrode stripes E1 and the second electrode stripes E2 in the switchable retarder 120c are not disposed co-planar to each other and the first electrode stripes E1 and the second electrode stripes E2 in the switchable retarder 120c are transparent electrode stripes. In addition, the switchable retarder 120c at least includes an insulation layer 1201 disposed between the first electrode stripes E1 and the second electrode stripes E2.

In the present embodiment, the gap G between two adjacent second electrode stripes E2 exposes the area of the first electrode stripe E1 and the vertical projection areas of the first electrode stripes E1 and the second electrode stripes E2 on the second substrate 1204 are optionally overlapped with each other or not overlapped with each other. The first electrode stripe E1 having the area exposed by the gap G is covered by the insulation layer 1201, and thus the locations of the second electrode stripes E2 and the locations of the first electrode stripes E1 would present different voltage when the first electrode stripes E1 and the second electrode stripes E2 are applied by the corresponding control voltages, which forms an electric field to control the status of the retardation medium 1206. Accordingly, each first electrode stripe E1 and one second electrode stripe E2 define one retardation region 122. In other words, the switchable retarder 120c utilizes the principle of the fringe field switching to switch the polarization provided by each retardation region 122. Therefore, the design of the electrode stripes in FIG. 9 further conduces to the achievement of the wide-view display effect.

Figure 10:
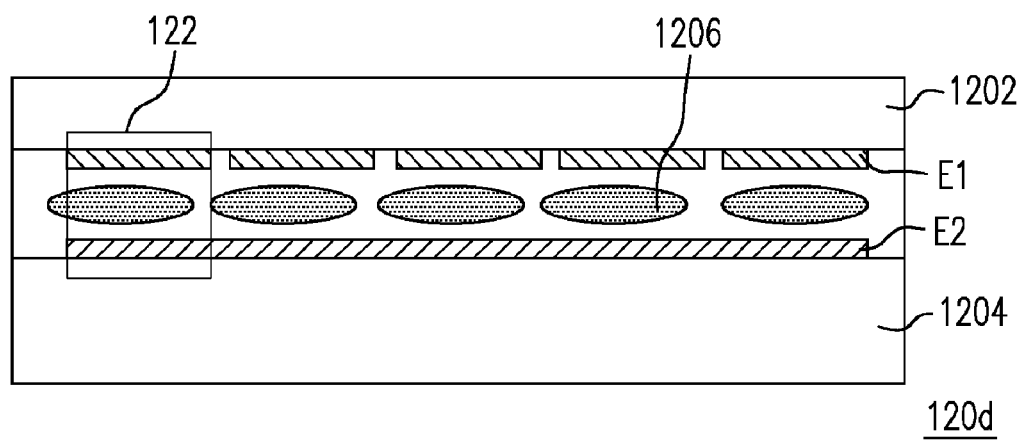
FIG. 10 illustrates a schematic cross-sectional view of the switchable retarder according to still another embodiment of the disclosure.
Figure 11:
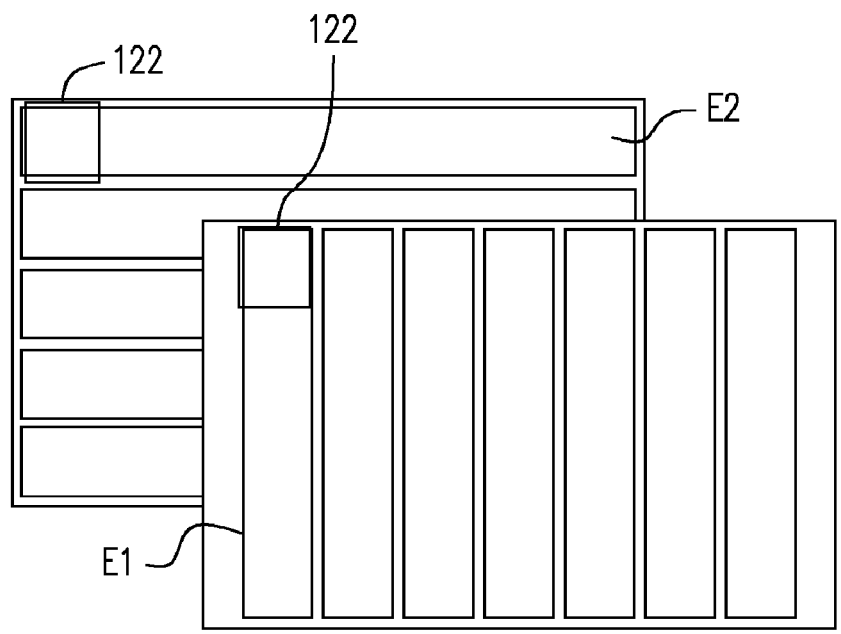
FIG. 11 illustrates schematic top views of the first electrode stripes E1 and the second electrode stripes E2 in the switchable retarder of FIG. 10 according to an embodiment.

It is worth mentioning that in the above embodiments, the first electrode stripes E1 and the second electrode stripes E2 are arranged in parallel substantially, but the disclosure is not limited thereto. FIG. 10 illustrates a schematic cross-sectional view of the switchable retarder according to still another embodiment of the disclosure and FIG. 11 illustrates schematic top views of the first electrode stripes E1 and the second electrode stripes E2 in the switchable retarder of FIG. 10 according to an embodiment. Referring to FIG. 10 and FIG. 11, the components in the switchable retarder 120d are the same to those in the switchable retarder 120a and those components are not iterated described. Nevertheless, the first electrode stripes E1 and the second electrode stripes E2 in the switchable retarder 120d respectively have different extending directions. Herein, the extending directions of the first electrode stripes E1 and the second electrode stripes E2 are perpendicular to each other, which is merely taken as an example but the disclosure is not particularly restricted to the extending directions of the electrode stripes.

In the present embodiment, the overlapping area of each first electrode stripe E1 and one second electrode stripe E2 can define one retardation region 122. When the switchable retarder 120d is applied in the display 100 or 102 of FIG. 1 or 3, the area of one retardation region 122 corresponds to a portion pixels 112 among the pixels 112 in the same line, for instance. As such, the varieties of the display 100 or 102 is improved to satisfy different requirements.

Figure 12:
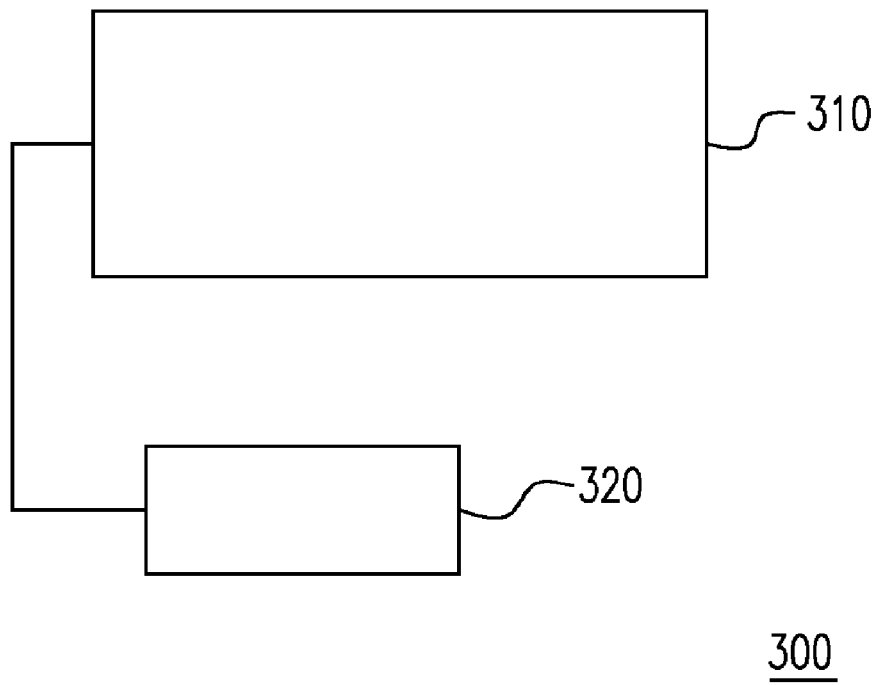
FIG. 12 schematically illustrates an electronic device according to an embodiment of the disclosure.

The displays of the above embodiments can be applied in numerous optical-electro elements or electronic devices. For example, FIG. 12 schematically illustrates an electronic device according to an embodiment of the disclosure. Referring to FIG. 12, an electronic device 300a can be formed by a display 310 in combination of an input unit 320, wherein the display 310 can be the display 100, the display 102, or a display equipped with one of the switchable retarder 120a-120d as described in the foregoing embodiments. In the electronic device 300, the input unit 320 is coupled to the display 310 and the input unit 320 provides an input function to the display 310 such that the display 310 displays images. The input unit 320 can, for example, be a power accessing button, a hot key, or the like, which can modulate the current status of the electronic device 300. In addition, the electronic device 300 can be a mobile phone, a digital camera, a personal digital assistant, a notebook, a desk computer, a television, a display applied in an automobile, or portable DVD machine.

In summary, the switchable retarder is disposed in front of the display panel capable of providing a polarized image to form a display according to the disclosure.

The polarized image displayed by each pixel can be transformed into two different polarizations. Therefore, the display according to the disclosure can display two images without the loss of the resolution and the two images are consisted of the polarized images having different polarizations. Accordingly, the required 2D or 3D images can be obtained by the user through a polarizing element. Furthermore, the switchable retarder is driven in a passive way so that the driving method and the driving circuit of the display are not complicated.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A display, comprising:
   a display panel providing a polarized image with a first polarization at a frame, wherein the display panel has a plurality of pixels; and
   a switchable retarder configured on a light path of the polarized image, and the switchable retarder comprising:
   a first substrate configured on the display panel;
   a plurality of first electrode stripes;
   a plurality of second electrode stripes, wherein the first electrode stripes and the second electrode stripes are configured between the display panel and the first substrate and electrically independent from each other, and each of the first electrode stripes and one of the second electrode stripes defines a retardation region, wherein an area of each of the retardation regions corresponds to an area of numbers of the plurality of pixels; and
   a retardation medium configured between the display panel and the first substrate and located at a side of the first electrode stripes and a side of the second electrode stripes, wherein the first electrode stripes are located between the retardation medium and the first substrate, and the second electrode stripes are located between the retardation medium and the display panel, and extending directions of the first electrode stripes and the second electrode stripes are different;
   wherein the retardation medium located in each retardation region is controlled by an electric field formed between the corresponding first electrode stripe and the corresponding second electrode stripe to provide a retardation, such that the polarized imaged with the first polarization is transformed into the polarized image with a second polarization or a third polarization shown by all the pixels at the frame, wherein the second polarization is different from the third polarization; and
   wherein at least one of the first and second electrode stripes is not parallelly aligned with an extending direction of a row of the pixels or a line of the pixels.

2. The display as claimed in claim 1, wherein one retardation region corresponds to at least one line of the plurality of the pixels.

3. The display as claimed in claim 1, wherein the display panel has a timing control unit for driving the plurality of pixels, and the timing control unit is electrically connected to the first electrode stripes and the second electrode stripes to apply corresponding control voltages to the first electrode stripes and the second electrode stripes.

4. The display as claimed in claim 1, further comprising a control chip electrically connected to the first electrode stripes and the second electrode stripes to apply corresponding control voltages to the first electrode stripes and the second electrode stripes.

5. The display as claimed in claim 1, wherein the switchable retarder comprises a second substrate configured between the display panel and the first substrate, and the first electrode stripes, the second electrode stripes, and the retardation medium are configured between the first substrate and the second substrate.

6. The display as claimed in claim 1, wherein the display panel comprises a polarizer configured adjacent to the switchable retarder to provide the polarized image.

7. The display as claimed in claim 1, wherein the display panel comprises a ¼ wavelength plate disposed at a side of the switchable retarder away from the display panel when the polarized image has a linear polarization.

8. The display as claimed in claim 1, wherein the second polarization is identical to the first polarization when the retardation is zero.

9. The display as claimed in claim 1, wherein the second polarization is different from the first polarization when the retardation is greater or smaller than zero.

10. An electronic device, comprising:
    a display, comprising:
    a display panel providing a polarized image with a first polarization at a frame, wherein the display panel has a plurality of pixels; and
    a switchable retarder configured on a light path of the polarized image, and the switchable retarder comprising:
    a first substrate configured on the display panel;
    a plurality of first electrode stripes;
    a plurality of second electrode stripes, wherein the first electrode stripes and the second electrode stripes are configured between the display panel and the first substrate and electrically independent from each other, and each of the first electrode stripes and one of the second electrode stripes define a retardation region, wherein an area of each of the retardation regions corresponds to an area of numbers of the plurality of pixels; and
    a retardation medium configured between the display panel and the first substrate and located at a side of the first electrode stripes and a side of the second electrode stripes, wherein the first electrode stripes are located between the retardation medium and the first substrate, and the second electrode stripes are located between the retardation medium and the display panel, and extending directions of the first electrode stripes and the second electrode stripes are different; and
    an input unit coupled to the display panel and the input unit providing an input function to the display panel such that the display displays images;
    wherein the retardation medium located in each retardation region is controlled by an electric field formed between the corresponding first electrode stripe and the corresponding second electrode stripe to provide a retardation, such that the polarized imaged with the first polarization is transformed into the polarized image with a second polarization or a third polarization shown by all the pixels at the frame, wherein the second polarization is different from the third polarization; and
    wherein at least one of the first and second electrode stripes is not parallelly aligned with an extending direction of a row of the pixels or a line of the pixels.

11. A display, comprising:
    a display panel providing a polarized image with a first polarization at a frame, wherein the display panel has a plurality of pixels; and
    a switchable retarder configured on a light path of the polarized image, and the switchable retarder comprising:
    a first substrate configured on the display panel;
    a plurality of first electrode stripes;
    a plurality of second electrode stripes, wherein the first electrode stripes and the second electrode stripes are configured between the display panel and the first substrate and electrically independent from each other, and extending directions of the first electrode stripes and the second electrode stripes are different, and each of the first electrode stripes and one of the second electrode stripes define a retardation region, wherein an area of each of the retardation regions corresponds to an area of numbers of the plurality of pixels; and a retardation medium configured between the display panel and the first substrate and located at a side of the first electrode stripes and a side of the second electrode stripes;

wherein the retardation medium located in each retardation region is controlled by an electric field formed between the corresponding first electrode stripe and the corresponding second electrode stripe to provide a retardation, such that the polarized imaged with the first polarization is transformed into the polarized image with a second polarization or a third polarization shown by all the pixels at the frame, wherein the second polarization is different from the third polarization; and wherein at least one of the first and second electrode stripes is not parallelly aligned with an extending direction of a row of the pixels or a line of the pixels.

12. An electronic device, comprising:

a display, comprising:

a display panel providing a polarized image has with a first polarization at a frame, wherein the display panel having a plurality of pixels; and a switchable retarder configured on a light path of the polarized image, and the switchable retarder comprising:

a first substrate configured on the display panel;

a plurality of first electrode stripes;

a plurality of second electrode stripes, wherein the first electrode stripes and the second electrode stripes are configured between the display panel and the first substrate and electrically independent from each other, and extending directions of the first electrode stripes and the second electrode stripes are different, and each of the first electrode stripes and one of the second electrode stripes define a retardation region, wherein an area of each of the retardation regions corresponds to an area of numbers of the plurality of pixels; and a retardation medium configured between the display panel and the first substrate and located at a side of the first electrode stripes and a side of the second electrode stripes, wherein the retardation medium located in each retardation region is controlled by an electric field formed between the corresponding first electrode stripe and the corresponding second electrode stripe to provide a retardation, such that the polarized imaged with the first polarization shown by all pixels passing through the switchable retarder is transformed into the polarized image with a second polarization or a third polarization shown by all the pixels at the frame, wherein the second polarization is different from the third polarization; and an input unit coupled to the display panel and the input unit providing an input function to the display panel such that the display displays images; and wherein at least one of the first and second electrode stripes is not parallelly aligned with an extending direction of a row of the pixels or a line of the pixels.

* * * * *